US012750286B2

(12) United States Patent
Poitau et al.

(10) Patent No.: US 12,750,286 B2
(45) Date of Patent: Sep. 29, 2026

(54) GENERALIZED FRAMEWORK FOR NETWORK INCIDENT MANAGEMENT

(71) Applicant: Dell Products L.P., Round Rock, TX (US)

(72) Inventors: Gwenael Poitau, Montreal (CA); Ibrahim Abu Alhaol, Nepean (CA); Javad Mirzaei, Toronto (CA); Rohit Arora, San Jose, CA (US); Said Tabet, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 44 days.

(21) Appl. No.: 19/038,921

(22) Filed: Jan. 28, 2025

(65) Prior Publication Data

US 2026/0222310 A1 Jul. 30, 2026

(51) Int. Cl.
*H04L 41/046* (2022.01)
*H04L 41/16* (2022.01)
*H04L 41/5006* (2022.01)

(52) U.S. Cl.
CPC ............ *H04L 41/16* (2013.01); *H04L 41/046* (2013.01); *H04L 41/5006* (2013.01)

(58) Field of Classification Search
CPC .... H04L 41/16; H04L 41/046; H04L 41/5006
USPC .......................................... 709/220, 224–229
See application file for complete search history.

(56) References Cited

U.S. PATENT DOCUMENTS 9,067,919 B2 * 6/2015 Langer ................. C07D 405/14
2008/0052253 A1 * 2/2008 Edwards ................ G06Q 50/06 705/412
2008/0288266 A1 * 11/2008 Diao ...................... G06Q 10/10 707/999.107
2013/0208387 A1 * 8/2013 Nguyen ................. H02H 9/042 361/118
2020/0274774 A1 * 8/2020 Rutten .................... H04L 41/28
2023/0090225 A1 * 3/2023 Thantharate .......... H04W 48/18 370/329
2023/0367695 A1 * 11/2023 Echague ............. G06F 11/3616
2024/0419705 A1 * 12/2024 Kotaru ................ G06F 16/3329
2025/0200663 A1 * 6/2025 Pathak .................... G06F 40/30
2025/0274367 A1 * 8/2025 Ananthanarayanan ...................... H04L 43/0823
2026/0025310 A1 * 1/2026 Zhang ..................... H04L 41/06

FOREIGN PATENT DOCUMENTS

EP 4572279 A1 * 6/2025 ............. G06N 20/00

* cited by examiner

*Primary Examiner* — Khanh Q Dinh
(74) *Attorney, Agent, or Firm* — Workman Nydegger

(57) ABSTRACT

Generalized network incident management is disclosed. When an incident in a network is detected, a request is generated and sent to a prompt generator. The prompt generator generates a prompt based on the request, key performance indicators of the network, and a semantic state of the network, which is generated by a first model. The prompt is input to a second model and the second model generates a recommended solution to the incident. An agent may evaluate the recommended solution and send a command to the network to resolve the incident. The prompt generator also generates the prompt using a graph neural network and/or a knowledge base. The network incident management can be automated and/or include a human-in-the-loop.

17 Claims, 7 Drawing Sheets

GENERALIZED FRAMEWORK FOR NETWORK INCIDENT MANAGEMENT

TECHNOLOGICAL FIELD OF THE DISCLOSURE

Embodiments disclosed herein generally relate to generative artificial intelligence (GenAI) for networks including radio access networks. More particularly, at least some embodiments relate to systems, hardware, software, computer-readable media, and methods for GenAI to support automated decision making and troubleshooting in radio access networks including telecommunication networks.

BACKGROUND

Radio access networks (RANs), such as telecommunication networks, can be large, complex, and heterogenous. When an incident happens in a RAN, such as an outage or a performance degradation, detecting and resolving the problem can take a substantial amount of time. One reason is that identifying and resolving the cause or source of the incident may require that multiple logs, with different timings, be analyzed. Manually reviewing multiple logs simply requires a lot of time.

Even if a solution to a network incident is identified, the solution may not respect or account for network component/application inter-dependencies. In other words, there is no guarantee that a solution to an existing incident will not adversely impact other network operations and potentially cause other or bigger problems.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings, in which.

DETAILED DESCRIPTION OF SOME EXAMPLE EMBODIMENTS

Embodiments disclosed herein generally relate to incident management in networks including telecommunication networks. More particularly, at least some embodiments relate to systems, hardware, software, computer-readable media, and methods for network incident management using models such as agentic foundation models (AFMs).

Artificial intelligence/machine learning (AI/ML) for wireless networks, including RANs such as telecommunications networks, faces various deployment related challenges. Conventional attempts typically have generalization limitations (e.g., for network topologies and conditions) and have difficulty coordinating multi-vendor and multi-agent solutions.

Embodiments of the invention relate to AI/ML deployments, including large scale deployments, in networks that overcome generalization limitations and coordination concerns. More specifically, embodiments of the invention are able to adapt to new network topologies and conditions, coordinate multi-vendor multi-agent applications, generalize to heterogenous networks, and the like. Embodiments of the invention may enable standardization in a manner that allows high level concepts (e.g., splicing) to be defined while leaving the granular implementation to GenAI applications. Embodiments of the invention are configured to provide orchestration and generalization capabilities and enable semantic communications in the context of network incident management, which may include decision making, troubleshooting, issue determination, solution generation, incident resolution, and the like or combinations thereof.

Figure 1A:
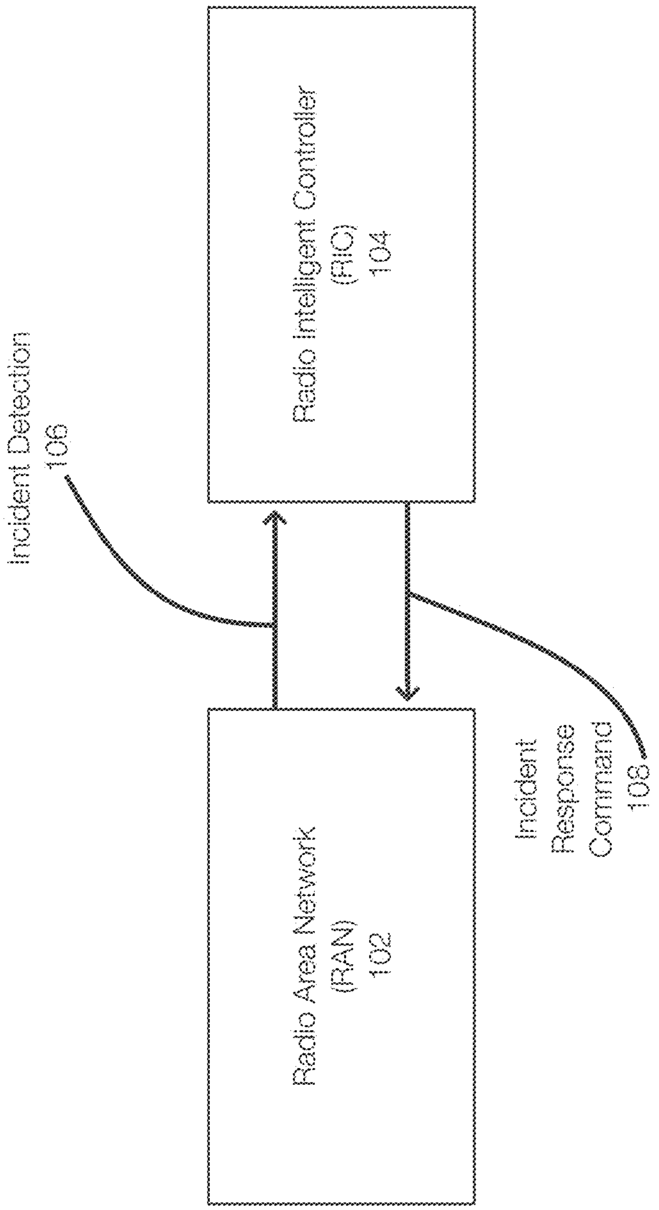
FIG. 1A discloses aspects of a framework, architecture, or system for network incident management.

FIG. 1A illustrates an example of a radio intelligent controller (RIC) associated with a network. FIG. 1A illustrates a radio access network (RAN) 102, which may be an open radio access network (O-RAN), and a RIC 104. The RIC 104 is configured to perform network incident management. Thus, when an incident is detected (incident detection 106) in the network 102, the RIC 104 performs network incident management, which may culminate in an incident response command 108 configured to resolve the incident. The RIC 104 may perform other actions such as generate alerts related to the incident, make a recommendation for resolving the incident, request human input, or the like or combinations thereof.

In this example, the network 102 is representative of networks in general. The network 102 may include radios (e.g., cell towers), communication infrastructure, end user devices (e.g., smart phones, tablets, computers, local networks), or the like. For example, the network 102 may be a wireless network, a telecommunications network, an O-RAN, or the like or combinations thereof. The network 102 may be a heterogenous network and be associated with multiple applications, hardware components (e.g., radios, towers, sub-networks, end user devices). The nature of the network 102, which may be large, conveys that many of the applications/hardware components that form the network 102 may be provided by multiple vendors, have different versions/operating systems/specifications, and the like. Further, many of these applications/components may have inter-dependencies, be provided by different vendors, and the like. This heterogeneity may cause various inter-dependencies that may or may not be known.

For a variety of reasons, incidents occur in the network 102 and the RIC 104 is configured to perform network incident management. Generally, network incident management may include detecting, evaluating, analyzing, responding to, and/or resolving incidents in the network 102. Network incident management may also include documenting these management operations for various reasons including the ability to audit the manner in which incidents were managed. For instance, it may be necessary to review actions or operations performed in an automated manner and/or by humans-in-the-loop.

An incident, by way of example, may include degraded performance, a network outage, unwanted intrusions (physical or network-based), unusual or unauthorized activity, failure to meet or satisfy service level agreements, and the like or combinations thereof. As previously stated, the complexity and heterogeneity of the network 102 makes network incident management, which may including troubleshooting operations, a challenging and difficult task.

The network 102 may include various tools that are configured to detect an incident. Various tools (performance monitors, intrusion detectors, outage detectors, user input) that may be configured to detect an incident. In this example, the RIC 104 receives an incident detection 106 when an incident is detected or determined in the network 102. The incident detection 106 may be accompanied by relevant metadata such as location, affected tower, connected users or the like. The type of metadata may depend on the incident and/or how the incident was detected.

The RIC 104 may include agentic foundation models (AFMs) (or other models such as large models (LMs) or large language models (LLMs)) for performing aspects of network incident management. These models are trained on relevant historical data, which may include historical incidents and/or their resolutions. More specifically, these models may be fine-tuned using data relevant to the operation of the network and/or responding to incidents. For example, a model may be trained using network logs, network reports, standards data, or the like or combination thereof. This helps ensure that any solutions recommended by the RIC 104 account for the network, normal network operations, relevant standards, service level agreements, or the like or combinations thereof.

Advantageously, this also allows any recommendations/commands/solutions determined by the RIC 104 to account for inter-dependencies at least because the inter-dependencies are reflected in the network logs and reports and/or in the fine-tuning performed. The RIC 104 can provide an informed and targeted solution to an incident or identify a source of the incident, which may be remedied based on relevant requirements. For example, an incident can be resolved in an automated manner (e.g., changing a setting) or may require human intervention (e.g., replacing a bad or defective network component).

Figure 1B:
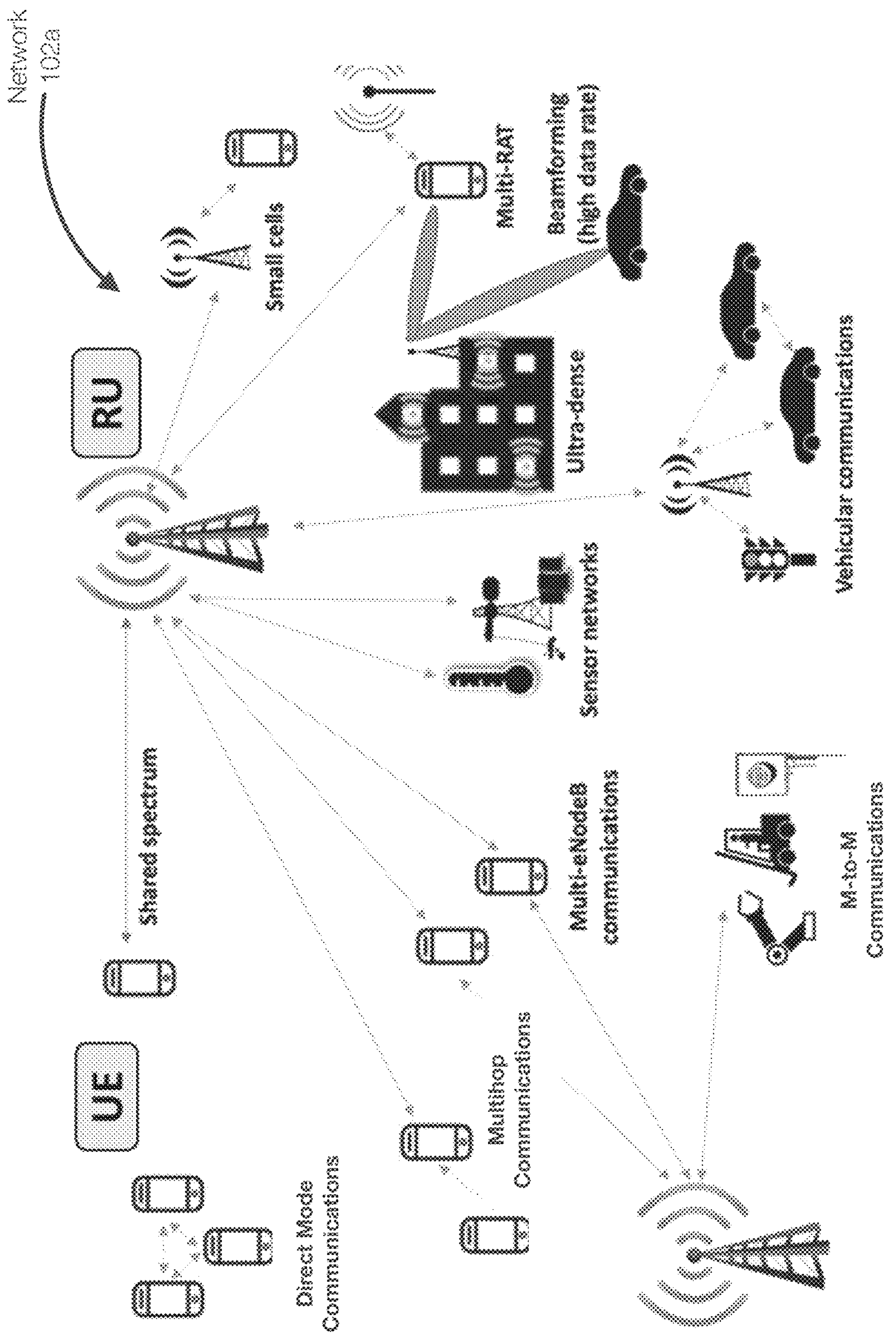
FIG. 1B discloses aspects of a heterogenous network.

FIG. 1B illustrates an example of a network. More specifically, FIG. 1B illustrates a network 102*a*, which is an example of the network 102. In this example, the network 102*a* includes towers, small cells, user equipment, multihop communications, multi-enodeB communications, sensor networks, vehicular communications, M-to-M communications, ultra-dense networks multi-RAT, beamforming, and the like. The network 102*a* illustrates the complexity of resolving incidents as many of the components generate logs and reports, are associated with multiple standards, and are of different types. Models that are trained with these logs, reports, and standards can account for inter-dependencies in the network 102*a*.

Figure 1C:
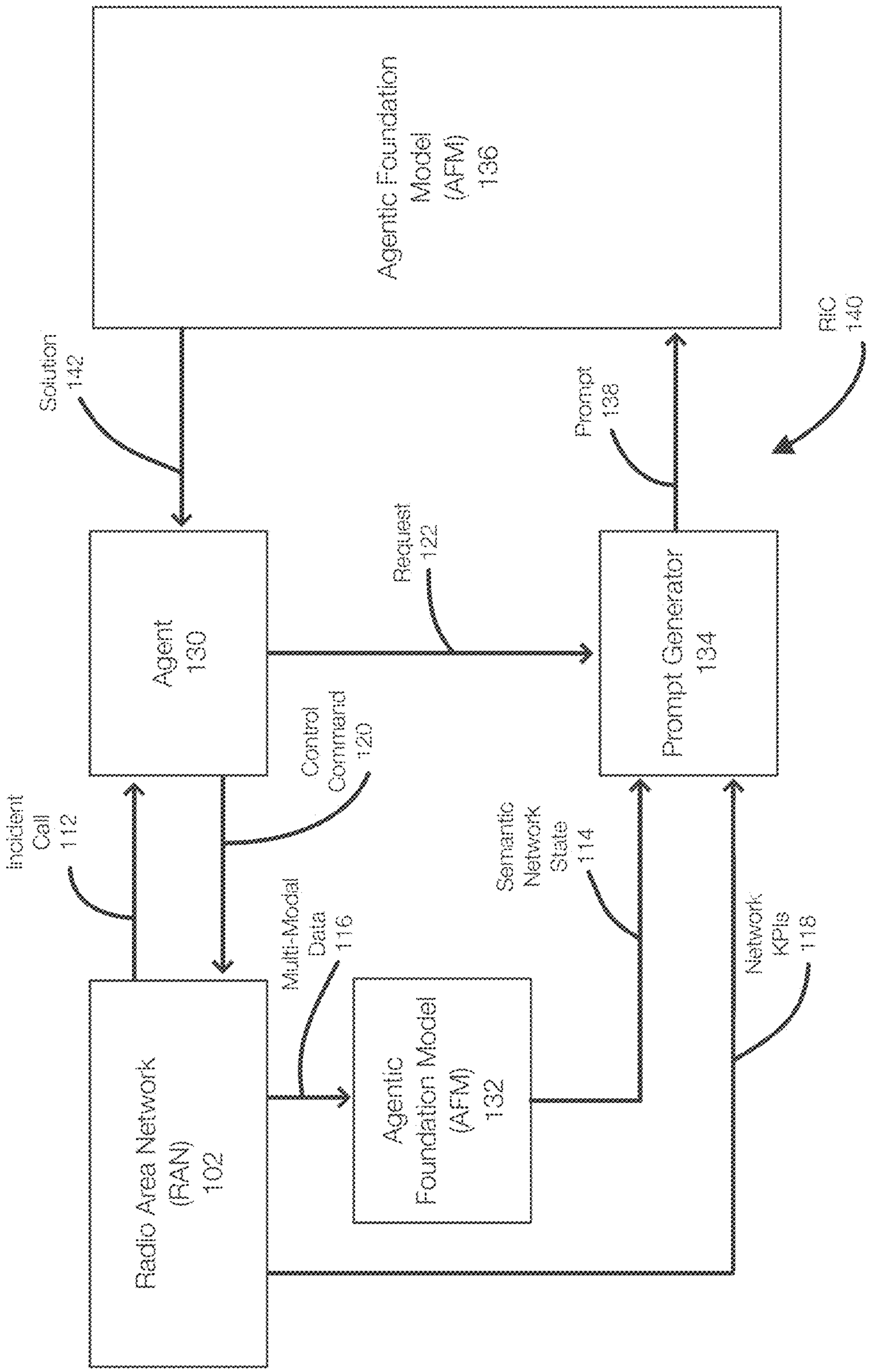
FIG. 1C discloses aspects of a radio intelligent controller configured to perform network incident management using multiple agentic models.

FIG. 1C illustrates an example of a framework, architecture, system, or controller for network incident management. FIG. 1C illustrates the network 102 and an RIC 140 (an example of the RIC 104). The RIC 140 may include an agent 130, an AFM 132, a prompt generator 134, and/or an AFM 136.

In this example, the network 102 may detect an incident and an incident call 112 is generated and received by the agent 130. The agent 130 generates a request 122 to the prompt generator 134. The prompt generator 134 may be configured to construct a prompt that may be based on the incident call 112 and/or associated metadata.

At the same time, network key performance indicators (KPIs) 118 are available to the prompt generator 134. In addition, an agentic foundation model (AFM) 132 is configured to receive multi-modal data 116 from the network 102. The AFM 132 is trained on historical multi-modal data and is configured to generate a semantic network state 114, which is input to or available to the prompt generator 134. Training the AFM 132 with multi-modal data allows inter-dependencies to be reflected in the output generated by the AFM 132.

In one example, the prompt generator 134 builds a prompt based on the network KPIs 118, the semantic network state 114, and/or aspects of the incident call 112 that may be included in the request 122. The prompt is input to the AFM 136.

The AFM 136 is configured (trained) to make a decision (generate a recommended solution) regarding the incident that resulted in the call 112. The AFM 136 thus makes a decision, which is provided to the agent 130. The agent 130 may evaluate the decision and send a control command 120 to the network 102.

The AFM 132 and the AFM 136 are trained with historical data that represents inter-dependencies among network components and applications. As previously stated, the AFM 132 is trained with historical multi-model data and/or historical network KPIs. The AFM 136 is trained using logs, standards, and other historical information including data related to historical incidents and/or their resolution. Because inter-dependencies resent in the network 102 are reflected in the network data (e.g., in the KPIs 118 and/or the multi-modal data 16, the decision made by or recommended by the AFM 136 is an informed and targeted solution to the incident in the network 102.

Figure 1D:
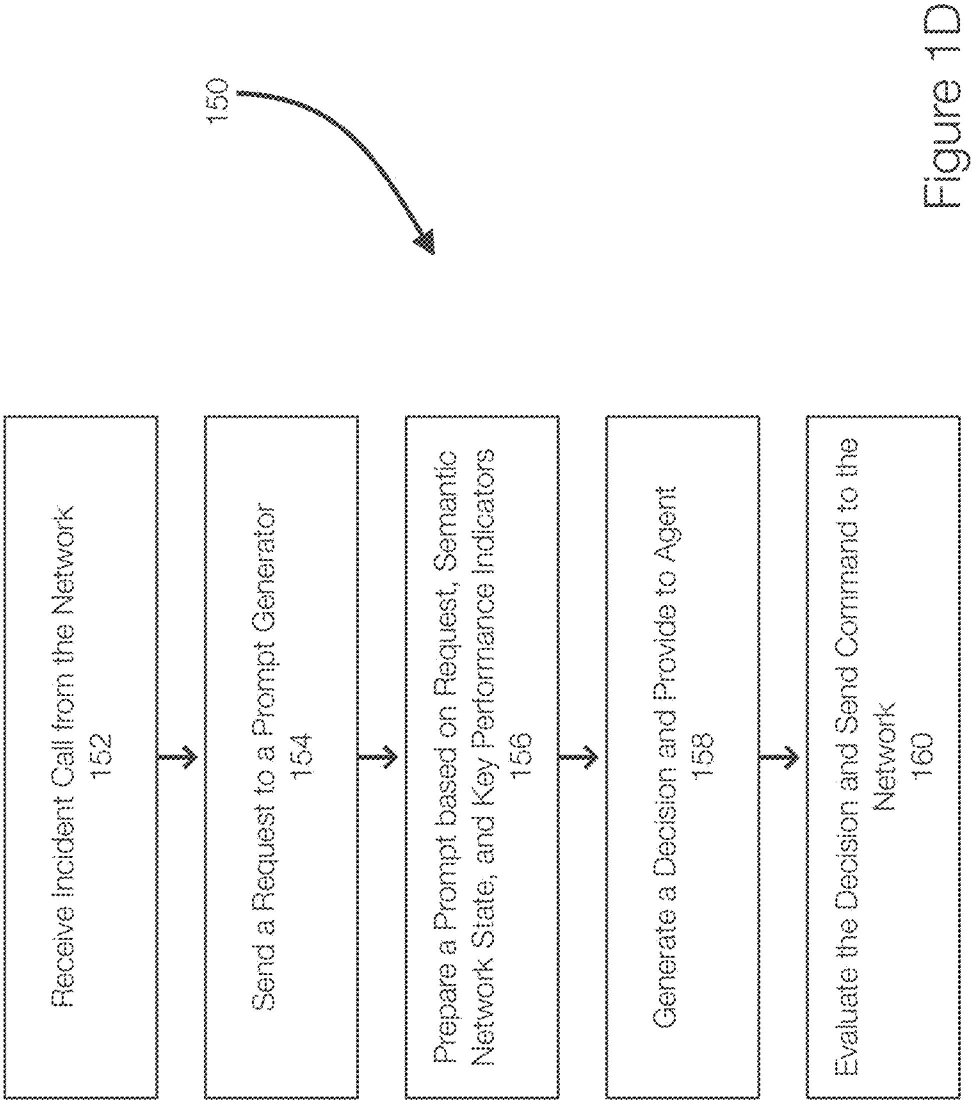
FIG. 1D discloses aspects of a method for performing network incident management in a network or in response to an incident detected in the network.

FIG. 1D discloses aspects of a method for performing network incident management. The method 150 includes receiving 152 an incident call or alert from the network. In response to the incident call, a request is formed and sent 154 to a prompt generator. The prompt generator generates or prepares 156 a prompt based on the request, a semantic network state output by an AFM model, and KPIs of the network. The prepared prompt is input into a second AFM, which generates 158 a decision (e.g., a recommended solution to the incident) and provides the decision to the agent. The decision is evaluated 160 by the agent and, if approved, sent to or implemented in the network to resolve the incident.

Returning to FIG. 1C, the AFM 132 is configured to generate a semantic network state 114 that is aware of the inter-relationships or inter-dependencies among network components, applications, and the like. The AFM 136 is configured to generate a decision, or an informed solution to an incident, that is also aware of the inter-dependencies among network components and applications.

Advantageously, embodiments of the invention provide a faster mean time to repair (e.g., lower MTTR). FIGS. 1A-1D also facilitate human in the loop in the context of AFMs 132 and 136.

In one example, the AFM 132 receives multi-modal data 116. By way of example only, the multi-modal data 116 may include two-dimensional images, three dimensional images, LiDAR (Light Detection and Ranging) data, global positioning system (GPS data), sensor data (e.g., Internet of Things (IoT) data, and/or the like, which may be generated in the network 102. The AFM 132 is trained on multi-modal data and is configured to generate a semantic network state 114 (e.g., embeddings or vectors representing the semantic network state). For example, multi-modal data received from, by way of example, sensors cameras, surveillance cameras, drones, satellites, LiDAR, and the like can be used to provide information that may be relevant to a network incident. For example, multi-modal data may be used to identify damaged equipment, environment data (storms, fires, flooding), physical breaches or intrusions. LiDAR data may allow damaged equipment or other issues to be more precisely located in a network or provide additional information. Comparing iterations of multi-modal data may allow damage or other aspects of incidents to be detected. Alternatively, the AFM 132 may be trained to recognize that image data is not normal and is thus indicative of a potential incident. The output or semantic network state 114 may include this the semantic network state in a vector or embedded form. In one example, the semantic network state 114 may represent damage, intrusions, normality, or other aspects of the network 102 reflected in the multi-modal data 116.

The network KPIs 118 may include various performance data or indicators. For example, the KPIs 118 may include signal strengths (received/transmitted) of radios, object velocities, signal to noise ratios, radio frequency related information, quality of service metrics (e.g., latency, jitter, packet loss), throughput, bandwidth utilization, power consumption, and the like.

The prompt generator 134 may receive the semantic network state 114 and the KPIs 118 and the request 122 to generate a prompt to the AFM 136. The request 122 input to the prompt generator 134 includes information related to the incident reflected in the incident call 112. For example, if an outage is detected, the request 122 may be a request to determine how to resolve an outage detected at a particular location. This may allow the prompt generator 134 to generate a prompt to the AFM 136 that includes, in addition to the request, context from the semantic network state 114 and the network KPIs 118.

More specifically, the semantic network state 114 and network KPIs 118 are typically available in real or near real time to the prompt generator 134. By way of example only, the prompt generator 134 may include all of the KPIs 118 and semantic network state 114 or focus on the portion of the KPIs 118 and semantic network state 114 related to the location of the outage in this example, which may be specified in the request. The prompt 138 is generated and input to the AFM 136.

The AFM 136 is trained on information such as network logs, network reports, standards documents, and the like. This data includes incident data. This allows the semantic network state 114, KPIs 118 and request 122, reflected in the prompt 138, to be evaluated in light of normal network operation, expected network operation, existing standards, service level agreements, incidents, or the like or combinations thereof.

For example, a portion of a network may be experiencing a situation where users are experiencing higher latencies and/or lower bandwidth. The semantic network state 114 may indicate that a larger than normal number of people/devices are congregated in a particular area (e.g., a concert) that is experiencing the higher latencies. The network KPIs may provide bandwidth usage or other network data, RF data, or the like.

The request may be to determine why higher latencies are occurring in this area. The prompt 138 thus includes a request to determine why higher latencies are occurring and the semantic network state 114 and network KPIs 118 may provide context. The AFM 136, with this data, may determine that the area only has the hardware to comply with service level agreements for n users. The solution 142 output by the AFM 136 may be that there are too many user devices for available resources and that some users may need to be disconnected.

The agent 130 may evaluate the solution 142 and issue a control command 120 to the network 102. The control command 120 may be to increase bandwidth, limit or reduce the number of devices able to connect to a particular tower, or the like.

In this example, the agent 130 may be an AI agent. However, the agent 130 may also be a human-in-the-loop.

Figure 2:
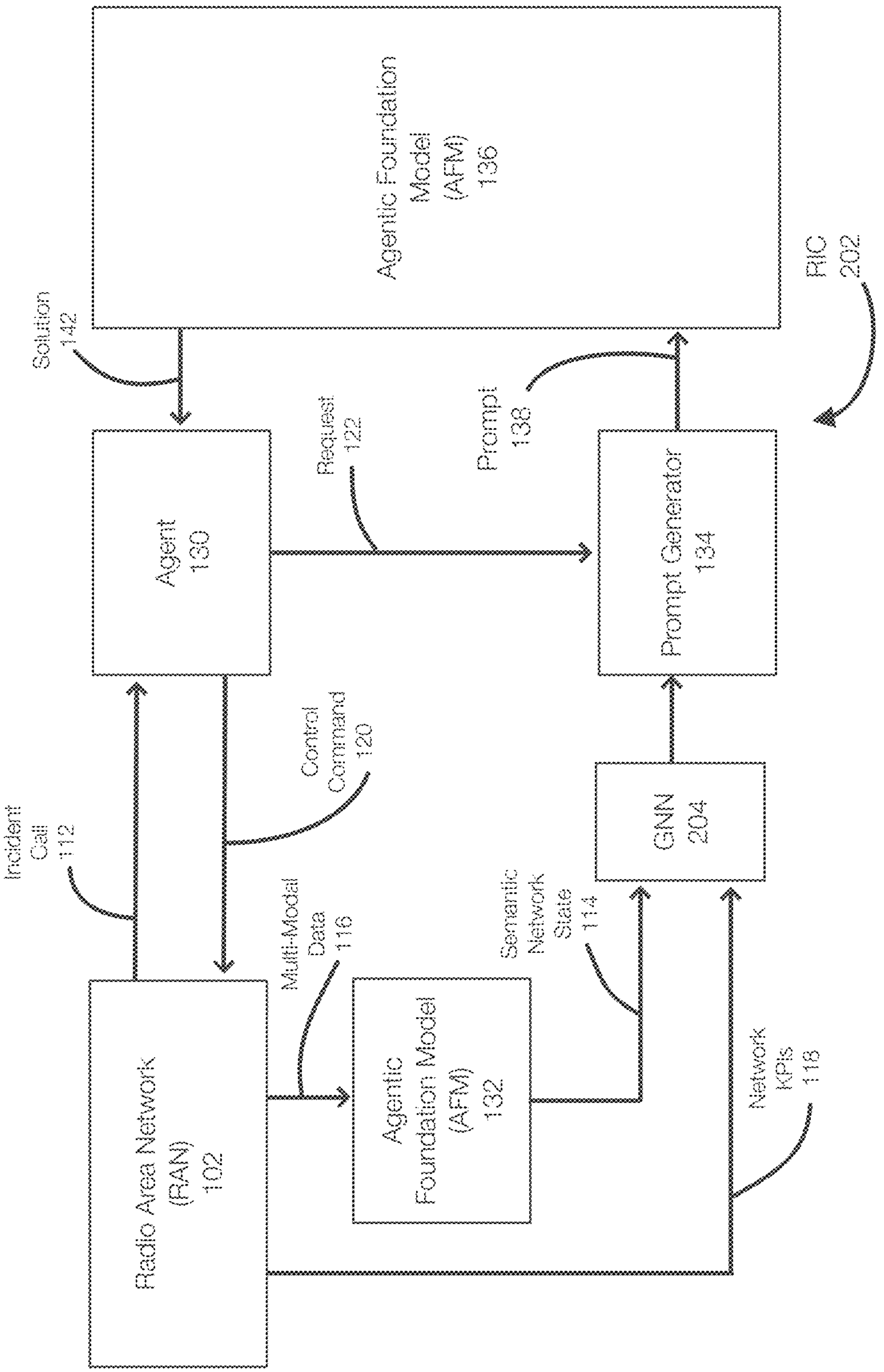
FIG. 2 discloses aspects of network incident management using agentic models and graph neural networks.

FIG. 2 discloses additional aspects of automated network incident management. The RIC 202 in FIG. 2, which is similar to the RIC 140 in FIG. 1C, includes a graph neural network (GNN) 204. In this example, the semantic network state 114 and the network KPIs 118 may be represented in a graph form and may represent current information about the network 102. This information (KPIs and semantic state information or data) is input to a GNN 204 (e.g., in graph form), and the GNN 204 generates an output for the prompt generator 134. The GNN 204 can output information for each node of the network 102 (e.g., class, learned features, embeddings). The GNN 204 is typically executed using the most recently available information relative to the request 122.

The output the GNN 204 is input, along with the request 122, into the prompt generator 134, which generates a prompt 138 to the AFM 136. As previously described, the AFM 136 generates a solution 142, which is evaluated by the agent 130. The agent 130 may issue a control command 120 to resolve the incident in the network 102 in accordance with the solution 142.

Figure 3:
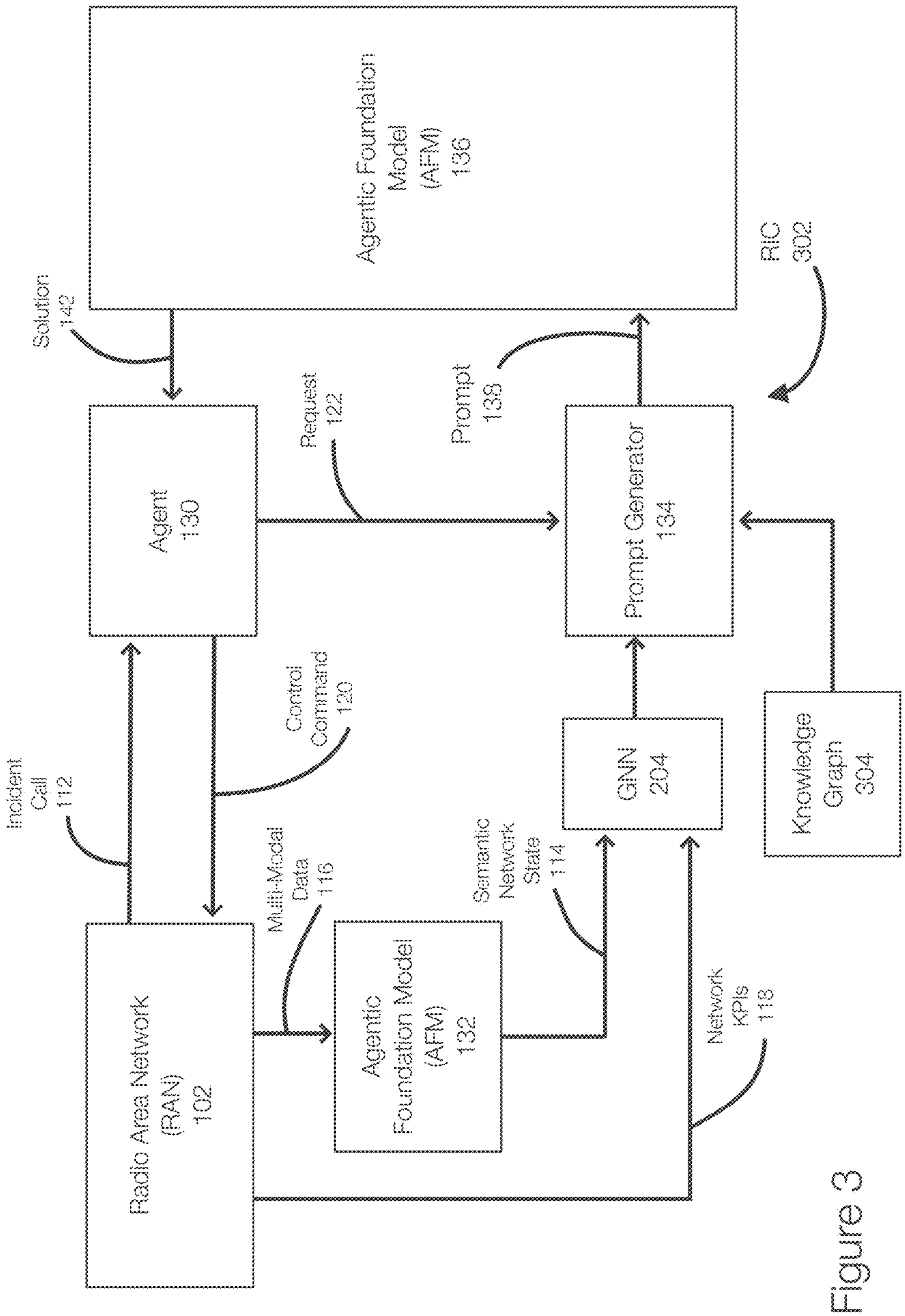
FIG. 3 discloses aspects of network incident management using agentic models, graph neural networks, and knowledge bases.

FIG. 3 discloses additional aspects of automated network incident management. FIG. 3 illustrates an RIC 302, which is similar to the RIC 140 and the RIC 202. In this example, the RIC 302 includes a knowledge graph 304. The knowledge graph 304 includes or represents known information relative to the network 102. For example, the knowledge graph 304 may include information specific to hardware and applications operating the network such as, but not limited to, version, firmware version, manufacturer, specifications (e.g., power, voltages, transmit/receive power, signal strength, latency, bandwidth) and the like. The knowledge graph 304 may include nodes corresponding to components, devices, applications and properties of the nodes may store metadata such as version, model, normal operating ranges, and the like. This type of information helps the AFM 136 understand which of the nodes, based on the output of the GNN 204, may be operating in a non-normative manner.

In the RIC 302, the prompt generator 134 may generate a prompt 138 that reflects the request 122, an output of the GNN 204 related to the current semantic network state 114 and network KPIs 118, and known data of the network represented in the knowledge graph 304. The knowledge graph 304 may provide additional context for the prompt generator 134 and may augment information included in the output of the GNN 204.

Embodiments of the invention advantageously improve network incident management in an automated manner. Embodiments of the invention reduce the MTTR and generate a recommended solution without having to manually review logs, reports, and/or standards. This is achieved by integrating AFMs into the RIC. This allows a first AFM to generate a semantic network state that is aware of inter-relations and inter-dependencies to be generated. A second AFM may be used to generate an informed recommended solution based on KPIs, semantic information based on multi-modal data, knowledge graphs, and the like that is also aware of inter-dependencies. The awareness to inter-dependencies comes from being trained with an appropriate dataset, which may include normal data, data associated with incidents of various kinds, and the like Embodiments of the invention also, if desired, facilitate human-in-the-loop input, but may also operate in an automated manner.

It is noted that embodiments disclosed herein, whether claimed or not, cannot be performed, practically or otherwise, in the mind of a human. Accordingly, nothing herein should be construed as teaching or suggesting that any aspect of any embodiment could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments. This discussion is not intended to limit the scope of the claims or this disclosure, or the applicability of the embodiments, in any way.

In general, embodiments may be implemented in connection with systems, software, and components, that individually and/or collectively implement, and/or cause the implementation of, network incident management operations, semantic network state generation operations, solution recommendation operations, or the like or combinations thereof. More generally, the scope of this disclosure embraces any operating environment in which the disclosed concepts may be useful.

New and/or modified data collected and/or generated in connection with some embodiments, may be stored in a data storage environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to perform operations initiated by one or more clients or other elements of the operating environment.

Example cloud computing environments, which may or may not be public, include storage environments that may provide data protection functionality for one or more clients. Another example of a cloud computing environment is one in which processing, data storage, data protection, and other services may be performed on behalf of one or more clients. Some example cloud computing environments in which embodiments may be employed include Microsoft Azure, Amazon AWS, Dell EMC Cloud Storage Services, and Google Cloud. More generally however, the scope of this disclosure is not limited to employment of any particular type or implementation of cloud computing environment.

In addition to the cloud environment, the operating environment may also include one or more clients capable of collecting, modifying, and creating, data. As such, a particular client or server or other computing system may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data storage system components such as databases, storage servers, storage volumes (LUNs), storage disks, servers and clients, for example, may likewise take the form of software, physical machines, containers, or virtual machines (VMs), though no particular component implementation is required for any embodiment.

As used herein, the term 'data' or 'object' is intended to be broad in scope. Example embodiments are applicable to any system capable of storing and handling various types of objects, in analog, digital, or other form. Synthetic documents and/or corresponding labels are examples of data or objects. Further, the AFMs may be trained with historical and/or synthetic data.

It is noted that any operation(s) of any of the methods disclosed herein, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments. These are presented only by way of example and are not intended to limit the scope of this disclosure or the claims in any way.

Embodiment 1

A method receiving an incident call from a network at an agent in response to a detected incident in the network, generating a request by the agent related to the detected incident, receiving, at a prompt generator, the request, a semantic network state of the network generated by a first model and key performance indicators from the network, generating a prompt based on the request, the semantic network state, and the performance indicators for input to a second model, generating a recommended solution by the second model; and sending a command to the network to resolve the incident.

Embodiment 2

The method of embodiment 1, wherein the agent is a human-in-the-loop or an artificial intelligence agent and the network comprises a heterogeneous telecommunications network.

Embodiment 3

The method of embodiment 1 and/or 2, wherein the key performance indicators comprise radio frequency (RF) data that may include signal strength and signal to noise ratio, bandwidth data, and/or latency data.

Embodiment 4

The method of embodiment 1, 2, and/or 3, wherein the first model comprises a first agentic foundation model or a first large language model and the second model comprises a second agentic foundation model or a second large language model.

Embodiment 5

The method of embodiment 1, 2, 3, and/or 4, wherein the semantic network state is generated from multi-modal data received from the network at the first model, the multi-modal data including one or more of two dimensional image data, three-dimensional image data, sensor data, Internet of Things data, and/or light detection and ranging (LiDAR) data.

Embodiment 6

The method of embodiment 1, 2, 3, 4, and/or 5, further comprising receiving the semantic network state and the key performance indicators at a graph neural network, wherein the prompt generator receives an output of the graph neural network, wherein the semantic network state and the key performance indicators are configured as a graph for input to the graph neural network and the output of the graph neural network represents an embedded semantic network state of the network.

Embodiment 7

The method of embodiment 1, 2, 3, 4, 5, and/or 6, wherein the prompt generator is further configured to receive input from a knowledge graph, wherein the knowledge graph represents known information about the network. The known information may include standard guidelines, known relationships/dependencies (upstream and/or downstream) among different components Embodiment 8

The method of embodiment 1, 2, 3, 4, 5, 6, and/or 7, wherein the prompt includes data from the request, the semantic network state, the key performance indicators, and the knowledge graph.

Embodiment 9

The method of embodiment 1, 2, 3, 4, 5, 6, 7, and/or 8, further comprising evaluating the recommended solution by the agent prior to sending the command.

Embodiment 10

The method of embodiment 1, 2, 3, 4, 5, 6, 7, 8, and/or 9, wherein the first model is trained on historical multi-modal data and the second model is trained on historical data including logs, standards, and incidents, where inter-dependencies in the network are represented or accounted for in the output of the first model and in the recommended solution output by the second model.

Embodiment 11

The method of embodiment 1, 2, 3, 4, 5, 6, 7, 8, 9, and/or 10, wherein the second model is trained on network logs, network reports, and/or standards.

Embodiment 12

A radio intelligent controller comprising: an agent configured to receive an incident call from a network, a first model configured to receive multi-modal data from the network and output a semantic network state, a prompt generator configured to receive the semantic network state and key performance indicators from the network and build a prompt, a second model configured to receive the prompt and generate a recommended solution to the incident, wherein the agent issues a command to the network to resolve the incident.

Embodiment 13

The radio intelligent controller of embodiment 12, further comprising: a graph neural network configured to receive the key performance indicators and the semantic network state, wherein an output of the graph neural network is input to the prompt generator, and a knowledge base that stores known information about the network, wherein the knowledge base is connected to the prompt generator such that the known information may be reflected in the prompt.

Embodiment 14

A system, comprising hardware and/or software, operable to perform any of the operations, methods, or processes, or any portion of any of these, disclosed herein.

Embodiment 15

A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of this disclosure also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality. Combinations of the above should also be included within the scope of computer storage media. Such media are also examples of non-transitory storage media, and non-transitory storage media also embraces cloud-based storage systems and structures, although the scope of this disclosure is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments may be downloadable to one or more systems or devices, for example, from a website, mesh topology, or other source. As well, the scope of this disclosure embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, agent, service, engine, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments may be performed in client-server environments, whether network or local environments, or in any other suitable environment. Suitable operating environments for at least some embodiments include cloud computing environments where one or more of a client, server, or other machine may reside and operate in a cloud environment.

Figure 4:
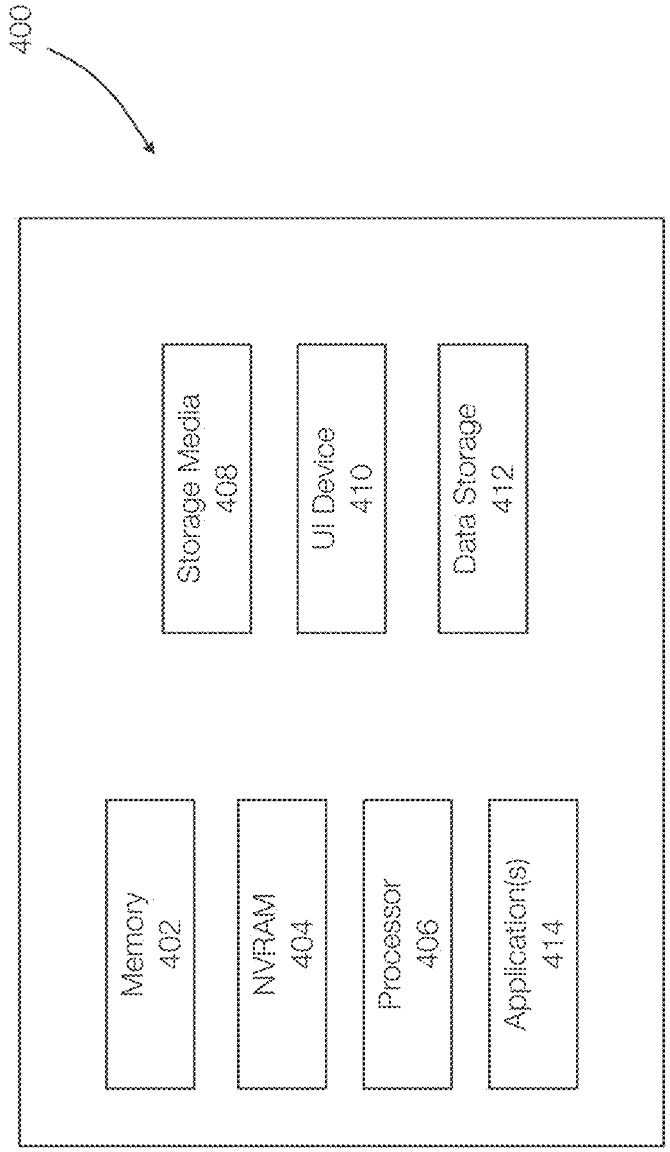
FIG. 4 discloses aspects of a computing device, a computing system, and/or a computing entity.

With reference briefly now to FIG. 4, any one or more of the entities disclosed, or implied, by the Figures and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

The device 400 may also represent a computing system such as a server or set of servers, an edge based computing system, a cloud-based computing system, or the like. The computing system may be localized or distributed in nature.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The device 400 may also represent a physical or virtual machine or server, an edge-based computing system, a cloud-based computing system, server clusters or other computing systems or environments. The device 400 may also represent multiple machines or devices, whether virtual, containerized, or physical. The device 400 may perform or execute steps or acts of the methods illustrated in the Figures.

The device 400 may represent a cloud-based system, an edge-based, system, an on-premise system, or combinations thereof. Document understanding and related operations may be performed using these types of computing environments/systems.

IN one example, the RIC may be integrated with the network, may be implemented using servers, clusters, or the like. The RIC may include distributed components. Data input to the models may be sourced from multiple locations and multiple models may be used in parallel.

The described embodiments are to be considered in all respects only as illustrative and not restrictive. All changes which come within the meaning and range of equivalency of the claims are to be embraced within their scope.

What is claimed is:

1. A method comprising:

receiving an incident call from a network at an agent in response to a detected incident in the network;

generating a request by the agent related to the detected incident, receiving, at a prompt generator, the request, a semantic network state of the network generated by a first model and key performance indicators from the network, wherein the semantic network state is generated from multi-modal data received from the network at the first model;

receiving the semantic network state generated by the first model and the key performance indicators at a graph neural network, wherein the prompt generator receives an output of the graph neural network, wherein the semantic network state and the key performance indicators are configured as a graph for input to the graph neural network and the output of the graph neural network represents the semantic network state of the network;

generating a prompt based on the request, the semantic network state, and the performance indicators for input to a second model;

generating a recommended solution by the second model; and sending a command to the network to resolve the incident.

2. The method of claim 1, wherein the agent is a human-in-the-loop or an artificial intelligence agent and the network comprises a heterogeneous telecommunications network.

3. The method of claim 1, wherein the key performance indicators comprise radio frequency (RF) data that may include signal strength and signal to noise ratio, bandwidth data, and/or latency data.

4. The method of claim 1, wherein the first model comprises a first agentic foundation model or a first large language model and the second model comprises a second agentic foundation model or a second large language model.

5. The method of claim 1, the multi-modal data including one or more of two dimensional image data, three-dimensional image data, sensor data, Internet of Things data, and/or light detection and ranging (LiDAR) data.

6. The method of claim 1, wherein the prompt generator is further configured to receive input from a knowledge graph, wherein the knowledge graph represents known information about the network.

7. The method of claim 6, wherein the prompt includes data from the request, the semantic network state, the key performance indicators, and the knowledge graph.

8. The method of claim 7, further comprising evaluating the recommended solution by the agent prior to sending the command.

9. The method of claim 1, wherein the first model is trained on historical multi-modal data and the second model is trained on historical data including logs, standards, and incidents, where inter-dependencies in the network are represented or accounted for in the output of the first model and in the recommended solution output by the second model.

10. The method of claim 1, wherein the second model is trained on network logs, network reports, and/or standards.

11. A non-transitory storage medium having stored therein instructions that are executable by one or more hardware processors to perform operations comprising:

receiving an incident call from a network at an agent in response to a detected incident in the network;

generating a request by the agent related to the detected incident, receiving, at a prompt generator, the request, a semantic network state of the network generated by a first model and key performance indicators from the network, wherein the semantic network state is generated from multi-modal data received from the network at the first model; receiving the semantic network state generated by the first model and the key performance indicators at a graph neural network, wherein the prompt generator receives an output of the graph neural network, wherein the semantic network state and the key performance indicators are configured as a graph for input to the graph neural network and the output of the graph neural network represents the semantic network state of the network;

generating a prompt based on the request, the semantic network state, and the performance indicators for input to a second model;

generating a recommended solution by the second model; and sending a command to the network to resolve the incident.

12. The non-transitory storage medium of claim 11, wherein the agent is a human-in-the-loop or an artificial intelligence agent and the network comprises a heterogeneous telecommunications network, wherein the key performance indicators comprise radio frequency (RF) data that may include signal strength and signal to noise ratio, bandwidth data, and/or latency data.

13. The non-transitory storage medium of claim 11, wherein the first model comprises a first agentic foundation model or a first large language model and the second model comprises a second agentic foundation model or a second large language model, the multi-modal data including one or more of two dimensional image data, three-dimensional image data, sensor data, Internet of Things data, and/or light detection and ranging (LiDAR) data.

14. The non-transitory storage medium of claim 11, wherein the prompt generator is further configured to receive input from a knowledge graph, wherein the knowledge graph represents known information about the network, wherein the prompt includes data from the request, the semantic network state, the key performance indicators, and the knowledge graph.

15. The non-transitory storage medium of claim 14, further comprising evaluating the recommended solution by the agent prior to sending the command.

16. The non-transitory storage medium of claim 11, wherein the first model is trained on historical multi-modal data and the second model is trained on historical data including network logs, network reports, network incidents, and/or standards such that inter-dependencies in the network are represent in the output of the first model and in the recommended solution output by the second model.

17. A radio intelligent controller comprising:

an agent configured to receive an incident call from a network;

a first model configured to receive multi-modal data from the network and output a semantic network state;

a prompt generator configured to receive the semantic network state and key performance indicators from the network and build a prompt;

a graph neural network configured to receive the key performance indicators and the semantic network state generated by the first model, wherein an output of the graph neural network is input to the prompt generator;

a knowledge base that stores known information about the network, wherein the knowledge base is connected to the prompt generator such that the known information may be reflected in the prompt; and a second model configured to receive the prompt and generate a recommended solution to the incident, wherein the agent issues a command to the network to resolve the incident.

* * * * *